US012565739B2

(12) United States Patent　　　　　(10) Patent No.:　US 12,565,739 B2

Leung et al.　　　　　　　　　　　　　(45) Date of Patent:　Mar. 3, 2026

(54) FATIGUE-RESISTANT FLEXIBLE ROAD STRUCTURE

(71) Applicant: Nano and Advanced Materials Institute Limited, Hong Kong (HK)

(72) Inventors: Lai Ming Gordon Leung, Hong Kong (HK); Ho Him Chan, Hong Kong (HK); Zhihua Xiao, Hong Kong (HK); Man Lung Sham, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 734 days.

(21) Appl. No.: 18/148,445

(22) Filed: Dec. 30, 2022

(65) Prior Publication Data

US 2024/0218609 A1　　Jul. 4, 2024

(51) Int. Cl.
| | |
|---|---|
| *E01C 3/00* | (2006.01) |
| *C04B 18/22* | (2006.01) |
| *C04B 40/00* | (2006.01) |
| *E01C 11/00* | (2006.01) |
| *C04B 111/00* | (2006.01) |

(52) U.S. Cl.
CPC .............. *E01C 3/003* (2013.01); *C04B 18/22* (2013.01); *C04B 40/0046* (2013.01); *E01C 11/00* (2013.01); *C04B 2111/0075* (2013.01)

(58) Field of Classification Search
CPC ... E01C 3/003; E01C 3/00; E01C 3/06; E01C 11/00; E01C 13/06; E01C 13/065; C04B 18/22; C04B 40/0046; C04B 2111/0075
See application file for complete search history.

(56) References Cited

U.S. PATENT DOCUMENTS

| | | | | | |
|---|---|---|---|---|---|
| 4,548,962 | A | * | 10/1985 | Lindmark | ............... C08L 19/00 |
| | | | | | 524/8 |
| 5,558,704 | A | * | 9/1996 | Masuda | .................. E01C 7/265 |
| | | | | | 524/70 |
| 7,160,049 | B2 | | 1/2007 | Saito et al. | |

FOREIGN PATENT DOCUMENTS

| | | | | |
|---|---|---|---|---|
| CN | 1807514 A | 7/2006 | | |
| CN | 101967048 B | 2/2013 | | |
| CN | 113564978 A | * 10/2021 | ............... E01C 7/00 |
| JP | 4424714 B2 | * 3/2010 | | |

* cited by examiner

*Primary Examiner* — Abigail A Risic
(74) *Attorney, Agent, or Firm* — IDEA Intellectual Limited; Sam T. Yip

(57) ABSTRACT

A fatigue-resistant flexible road structure that includes one or more sub-base structural support layers positioned over a compacted earth foundation. At least one of the sub-base structural support layers is an elastic sub-base layer for more completely distributing surface loads. The elastic sub-base layer includes aggregate, filler, binder, and recycled tire rubber. The recycled tire rubber is included in an amount of 3% to 5% by weight of the sum of aggregate, filler, and rubber. The elastic sub-base layer has a fatigue life at least 25 percent greater than a non-elastic sub-base layer without recycled rubber. Further, the elastic sub-base layer has a modulus of elasticity at least 25 percent lower than a non-elastic sub-base layer without recycled rubber.

18 Claims, 8 Drawing Sheets

FATIGUE-RESISTANT FLEXIBLE ROAD STRUCTURE

FIELD OF THE INVENTION

This present invention relates to a multilayer fatigue-resistant flexible road structure and, more particularly, to a fatigue-resistant road structure employing recycled waste tires to enhance elasticity in one or more base or sub-base road layers.

BACKGROUND

Each year there are large quantities of abandoned waste vehicle tires that can be difficult or hazardous to process. Waste tires are typically stacked in large piles in waste recycling yards in suburban or rural areas, causing environmental and hygiene problems due to the highly durable and non-biodegradable rubber in the tires. The recycling of tire rubber is necessary in order to reduce the amount of tire waste. Rubber has been used in asphalt materials, typically in surface layers of pavement systems, for several decades. When used in surface layers, it can improve the skid resistance and durability of asphalt mixtures while reusing the waste tires.

The waste tire rubber has been used to modify surface asphalt mixtures usually by two different processing methods: 1. Wet process, where fine rubber is blended with hot bitumen to produce a rubberized bitumen binder or 2. Dry process, which substitutes a proportion of the aggregate with particles, thereby causing the rubber to function essentially as a kind of aggregate within the mixture. The recycled rubber contents of the wet process and the dry process in pavement are 14 kg/m³ and 110 kg/m³ respectively. That is, the use of dry mix designs can recycle roughly 700% of the commonly adopted wet process. However, dry processes are rarely used in pavement systems.

PlusRide, a US patented dry process rubber asphalt mix design, was developed in 1980s. It focuses on the surface layer of pavement and aims to reduce the skidding resistance during snowing time of winter. The desired air void of the particular surface pavement layer is 3.5%. However, it was found that the air void of the final pavement was in the range 2.3-7%, which reflected the rubber swelling phenomenon. From the paving experience of PlusRide, due to the rubber swelling effect, it is technically difficult to achieve the desired air void in the surface pavement. The objective of requiring air voids in the pavement is to prevent bleeding, which will cause skidding when excessive bitumen is squeezed up to the surface of the pavement under certain traffic loads. Due to the restriction of air voids, it is not technically feasible to pave a good quality pavement by a dry process in surface layer.

Material fatigue is an important contributing factor to the life of a pavements system. Fatigue leads to surface cracks as seen in FIG. 1A. Fatigue cracking is typically caused by a bottom-up support issue. For example, as seen in FIG. 1B, bending tension in an upper asphalt layer can lead to cracks that propagate to the upper surface of the pavement system. Additionally, rutting may result from accumulated surface deformation caused by repeated wear due to traffic. Fatigue cracking and rutting may be caused, in part, due to a weakened base layer or sub-base layer. Both rutting and fatigue cracking require expensive repairs that can involve stripping and repaving of the top pavement system layers or even the replacement of entire sections of a road.

Thus, there is a need in the art for improved pavement systems that make effective use of recycled tire waste as well as improve the fatigue life of the road surface. The present invention addresses this need.

SUMMARY OF THE INVENTION

The present invention has determined that creating an elastic base or sub-base support layer through the addition of recycled tire rubber surprisingly improves the fatigue life of a flexible road structure by at least 25 percent as compared to a flexible road structure without such an elastic base or sub-base layer.

In particular, the use of recycled tire rubber in a support layer dry process avoids the prior art problems of air void restriction and bleeding, allowing compaction to a very high extent to ensure the structural stability and performance of the road structure. The use of a dry process in a structural layer not only recycles more waste tire but also improves the durability of the pavement. Fatigue resistance is the key property to determine the quality of design. In the dry process, the recycled rubber is treated as part of the aggregate and functions as a kind of elastic aggregate. Due to the elastic property of rubber, the pavement durability is enhanced since the stress is dissipated rather than concentrated at certain points in a rigid system.

In one aspect, the present invention provides a fatigue-resistant flexible road structure that includes one or more sub-base structural support layers positioned over a compacted earth foundation. At least one of the sub-base structural support layers is an elastic sub-base layer including aggregate, filler, binder, and recycled tire rubber. The recycled tire rubber is included in an amount of 3% to 5% by weight of the sum of aggregate, filler, and rubber. The elastic sub-base layer has a fatigue life at least 25 percent greater than a non-elastic sub-base layer without recycled rubber. Further, the elastic sub-base layer has a modulus of elasticity at least 25 percent lower than a non-elastic sub-base layer without recycled rubber.

One or more load-distributing base layers are positioned over the one or more sub-base structural support layers. The load-distributing base layers include at least aggregate, filler, and binder, and have an air void content of approximately 3 to 5 percent.

One or more surface layers is positioned above the one or more load-distributing base layers. The one or more surface layers include at least one vehicle-contacting layer configured to prevent surface water from entering the base and sub-base layers, the one or more surface layers having an air void content greater than the air void content of the one or more load-distributing base layers.

The fatigue-resistant flexible road structure elastic sub-base layer is a dry process sub-base layer. The aggregate is present in an amount from approximately 82 to 86.5 weight percent and has a particle size distribution of approximately 0.075 mm to 50 mm. The filler is present in an amount of approximately 7 to 9 percent by weight and has a particle size smaller than approximately 0.075 mm. The binder is present in an amount of approximately 3.5 to 6 percent by weight.

In one aspect the elastic sub-base layer binder is a bituminous binder.

In a further aspect, the one or more load-distributing base layer binder is a bituminous binder.

In a further aspect, the one or more surface layers includes an upper vehicle-contacting surface layer and a lower surface layer.

In a further aspect, the upper vehicle-contacting surface layer has an air void content of approximately 18 to 25 percent.

In a further aspect, the lower surface layer has an air void content of approximately 3 to 5 percent.

In a further aspect, a total thickness of the one or more sub-base structural support layers 400 to 800 millimeters.

In a further aspect, a total thickness of the one or more surface layers is 40 to 80 millimeters.

In a further aspect, a total thickness of the one or more base layers is 50 to 200 millimeters.

In a further aspect, the one or more sub-base structural support layers includes a lower sub-base layer and an upper sub-base layer and wherein the elastic sub-base layer is the upper sub-base layer.

In a further aspect, the one or more sub-base structural support layers includes a lower sub-base layer and an upper sub-base layer and wherein the elastic sub-base layer is the upper sub-base layer and wherein the lower sub-base layer includes aggregates without a binder.

In a further aspect, the recycled rubber has a particle size distribution of 40 to 50 percent fine particles have a particle size of 0.075 to 1.18 millimeter and 50 to 60 percent coarse particles having a particle size of 1.18 to 5 millimeters.

In a further aspect, the recycled rubber has a particle size distribution of 30 to 40 percent fine particles have a particle size of 0.075 to 1.18 millimeter and 60 to 70 percent coarse particles having a particle size of 1.18 to 5 millimeters.

In a further aspect, the recycled rubber has a particle size distribution of 10 to 20 percent fine particles have a particle size of 0.075 to 1.18 millimeter and 80 to 90 percent coarse particles having a particle size of 1.18 to 5 millimeters.

The present invention additionally provides a method for making the fatigue-resistant flexible road structure. For the elastic sub-base layer, the aggregate is mixed with recycled tire rubber to form an aggregate-recycled tire mixture. The binder is added to the aggregate-recycled tire mixture followed by mixing in the filler at a mixing temperature.

In the method the mixture of aggregate, filler, binder, and recycled tire rubber is annealed at an annealing temperature during one or more compaction cycles.

The one or more compaction cycles may include a first compaction, cooling and a second compaction until the temperature at a surface is below 40° C.

BRIEF DESCRIPTION OF THE DRAWINGS

FIG. 1A shows fatigue cracks and FIG. 1B shows stresses leading to the fatigue cracks of FIG. 1B.

FIG. 1C is an overall layer structure while FIG. 1D shows an option with additional sublayers within the overall layer structure.

DETAILED DESCRIPTION

Figure 1A:
FIGS. 1A-1B depict conventional pavement structural issues.
Figure 1B:
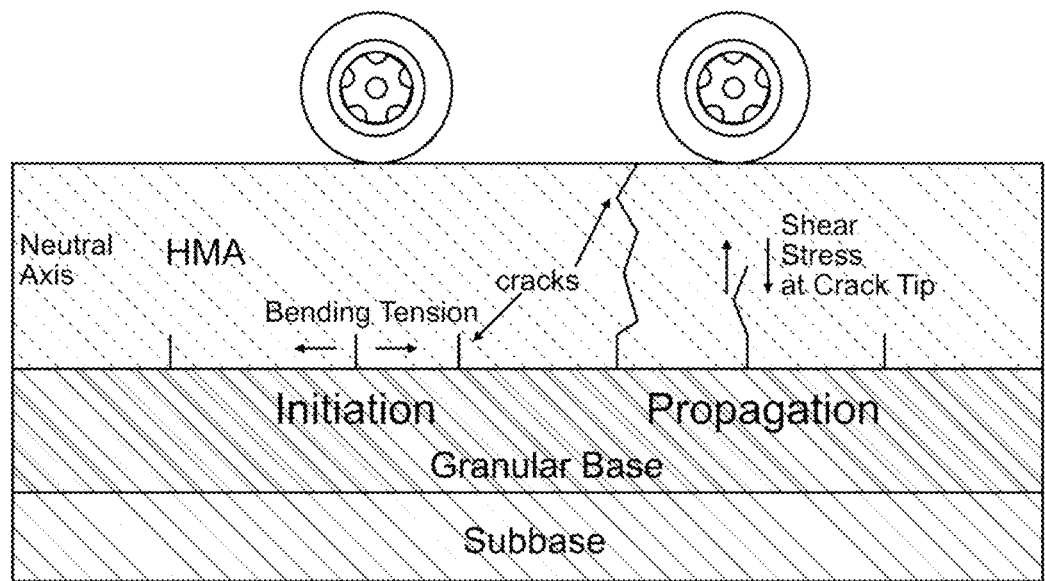
Figure 1C:
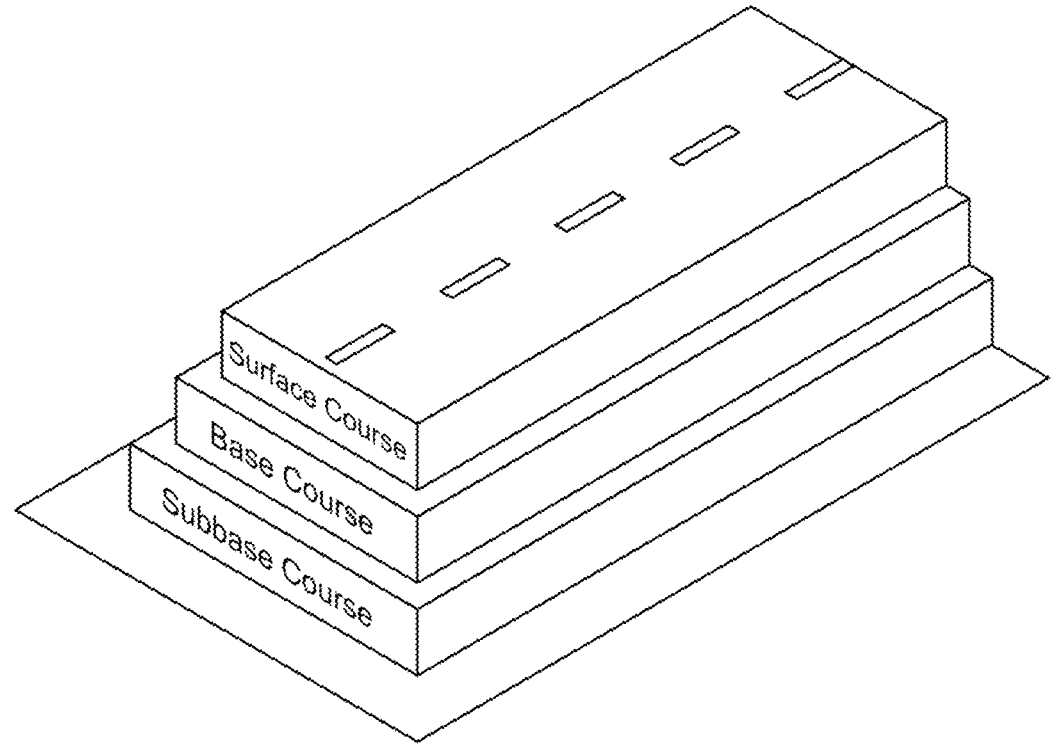
FIGS. 1C-1D show a flexible road structure according to the present invention.

The present invention provides a fatigue-resistant flexible road structure through the use of recycled rubber in one or more sublayers to create an elastic layer that distributes road traffic loads, alleviating stresses that create and propagate fatigue cracks. In general, flexible road structures are termed "flexible" because the overall structure bends, deflects, or "flexes" under loading. Turning to FIG. 1C, an overview of a flexible road structure is presented. The structure includes a surface course, a base course, and a sub-base course positioned over compacted earth.

The several material layers of the flexible road structure each receive the loads from the above layer, spreads them out, and then passes them on to the layer below. Material layers are usually arranged within a pavement structure in order of descending load bearing capacity with the highest load bearing capacity material on the top and the lowest load bearing capacity material on the bottom. A typical flexible "overall" pavement structure is shown in FIG. 1C and includes three main structural elements, each of which can optionally include multiple sub-layers, as will be discussed in further detail below:

Surface Course Layer

This layer contacts vehicle traffic loads and provides adequate friction to the tires traversing the layer while also being sufficiently smooth and resistant to ruts. Importantly, for climates with rainfall, it drains the rainfall and prevents water seepage in to underlying layers.

Base Course Layer

The base course layer is positioned beneath the surface course and helps to distribute the load from the surface course. It can also further divert water to prevent penetration to lower layers; this is particularly important for climates that undergo freezing in the winter. Water infiltration into lower layers can lead to "frost heave" when ice is formed in lower layers, expanding the layers.

Sub-Base Course Layer

The sub-base layer is positioned beneath the base layer and over the compacted earth substrate. It is a structural support layer while also preventing compacted earth/soil from entering the upper layers. When plural sub-base layers are used, one layer may be an aggregate layer without a binder.

Figure 1D:
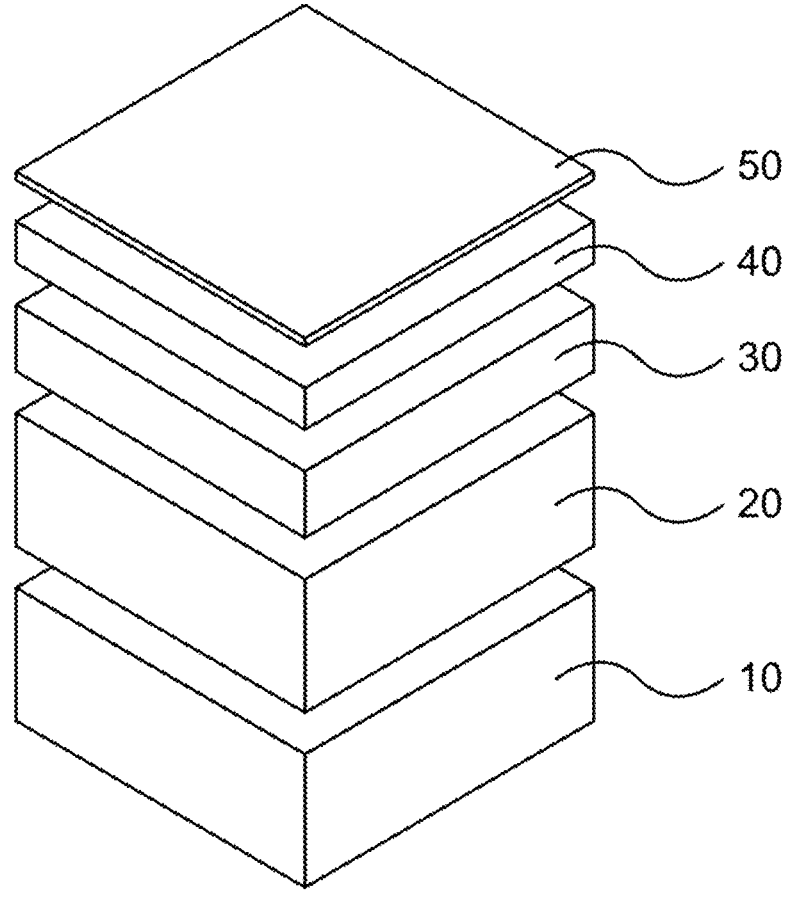

FIG. 1D shows a particular road structure that may be used in the system of the present invention. In FIG. 1D, there are two surface course layers, upper layer 10 and lower layer 20, at least on base course 30, and two sub-base courses, 40 and 50. The recycled rubber elastic layer of the present invention is typically used as upper sub-base course layer 40 but, for certain road structures, may instead be used as base layer 30. In some embodiments, the recycled rubber elastic layer may be the only sub-base layer. Generally, it is understood that the number, type, and thicknesses of road structure layers vary according to climate and the soil conditions of the underlying earth. Temperature ranges, annual rainfall, and drainage of the underlying soil all affect the number and choice of sublayer materials, as is understood by those familiar with road structure construction. As such the selection of position of the elastic layer of the present invention may change according to the particular application.

Various embodiments of the present invention were designed for the environmental and soil conditions of southern China, in particular, Guangdong province and Hong Kong, which both feature a generally sub-tropical climate with considerable annual rainfall. The table below shows a layer structure, including thicknesses and porosity, for a road structure in Hong Kong.

TABLE 1

| Specification of pavement layers in Hong Kong | | |
| --- | --- | --- |
| Layer | Category | Air void requirement |
| Porous layer (35 mm) | Surface Course | 18-25% |
| Wearing Course (40 mm) | | 3-5% |
| Base Course | Base Course | 3-5% |
| Roadbase | Sub-base Course | — |

To generalize the terminology regarding the above structures, the terms upper and lower surface layer are used, along with base layer, and upper and lower sub-base layers. However, it is understood that the invention applies equally to structures with a single surface, base, and sub-base layer.

Generally, the one or more surface layers 10, 20 include aggregate bound with a bitumen-based binder such that it prevents surface water from entering the base and sub-base layers. Note that the highly porous upper surface layer, that is, a void content of greater than 18 percent, is typically only used on high speed roadways as a friction course and provides drainage channels for diverting rainwater to the side drains, thus keeping the road surface as dry as possible during heavy rainfall conditions. Such a porous layer is acceptable in warmer climates that do not experience extensive freezing temperatures but are not used in climates where water contained in the pores can freeze and spall the layer. In colder climates, the upper layers may have a lower void content, typically about 3 to 9 volume percent. Note that void content is not always a design requirement but typically a by-product of imperfect compaction conditions in the field during road construction.

Layer 30 is one or more load-distributing base layers made from aggregate, filler, and binder. It should have an air void content of approximately 3 to 7 percent, more particularly 3 to 5 percent.

The one or more sub-base structural support layers 40 (and, optionally, 50) are positioned over a compacted earth foundation and are elastic sub-base layer(s) including aggregate, filler, binder, and recycled tire rubber. The recycled tire rubber is present in an amount of 3% to 5% by weight of the sum of aggregate, filler, and rubber. As will be discussed in further detail below, the elastic sub-base layer 40 has a fatigue life that is at least 25 percent greater than a non-elastic sub-base layer without recycled rubber. Further, the elastic sub-base layer has a modulus of elasticity at least 25 percent lower than a non-elastic sub-base layer without recycled rubber. Layer 50, if present, may optionally be an unbound aggregate layer that is positioned between the compacted earth layer and the elastic sub-base layer.

The aggregate may be a gravel-type aggregate, such as a granite-based aggregate or other crushed rock aggregates. Aggregate size is selected depending on the particular layer, the mix of aggregate and filler, and the climate/soil conditions. In the examples of the present invention, the nominal aggregate size is approximately 37.mm for roadbase/sub-layer. It is understood that other aggregate materials and sizes may also be used. The filler may be a sand based filler and include particles sizes typically in a range of approximately 0.06 mm to approximately 2 mm. Other aggregates and fillers such as fine gravel, pebbles, recycled ground concrete, recycled construction materials, recycled road materials, or slag may also be used.

The binder is made from bitumen which is a highly viscous substance that is typically a byproduct of the distillation of crude oil (although naturally-occurring bitumens may also be used). Bitumens made from fractional distillation of used motor oil may also be used. Bitumen is graded based on its penetration property which indicates the hardness of the bitumen. There are generally five penetration sub-grades which differ in the level of stiffness—the lower the number, the harder the bitumen, while larger numbers mean softer bitumens. In the road structure of the present invention, 60/70 grade bitumen is used (that is, a needle with a 100 g load at 25° C. will penetrate between 60-70 mm). 60/70 bitumen is used in a wide range of climates and is also suitable for high-traffic roads.

In general, penetration grade of 40-50 is a harder grade used in hot climates, 60-70 or 85-100 are used for moderate ambient temperatures, 120-150 may be used for moderate temperatures on low-traffic roadways, while large values such as 200-300 are used in very cold climates.

Wet Process Vs Dry Process for Incorporation of Recycled Rubber

Rubber is added as a raw material into asphalt pavement via a dry process or a wet process. The dry process substitutes a proportion of the mix aggregate with recycled rubber, thereby causing the recycled rubber to function as an elastic aggregate. The dry technique is the technique used to prepare the elastic layer of the present invention.

In contrast, the wet process involves blending fine crumb recycled rubber with hot bitumen to produce a 'rubberized bitumen' binder prior to mixing with aggregates. This modified binder used recycled rubber in an amount of about 14 kg/m$^3$ of pavement. However, the rubber-modified binder has a higher viscosity so that an increase of mixing temperature is necessary to ensure good mixing quality, thus producing more pollution. Further, sinking of rubber during binder modification can lead to uneven distribution of rubber and a poor quality product.

The dry process used in the present invention uses substantially more recycled rubber e.g., approximately 110 kg/m$^3$, which is about 700% more than the wet process. Since rubber is treated as part of the aggregate in the dry process, no significant fabrication process modification is needed in the physical plant. The mixing temperature is lower than that of the wet process and is close to that of normal asphalt or RAP asphalt. It is a simpler, more convenient, and more practical process for plant users. In addition, similar to RAP mixing process, no heating is required for rubber. As will be seen from the Examples below, the mixing process is straightforward, making it a practical choice for large-scale road construction.

EXAMPLES

Test Methods

Indirect Tensile Fatigue Test (ITFT) and Indirect Tensile Stiffness Modulus (ITSM) are conducted according to BS EN 12697-24 and BS EN 12697-26, respectively. For the analytical design of the elastic layer material, indirect tensile tests on cylindrical shaped specimens (IT-CY) are used to determine the relevant characteristics for stiffness and fatigue of materials. The deformation measurement system includes two LVDTs which are placed centrically on the cross-sectional area of the specimen. The measurements obtained during the tests are applied vertical force and horizontal displacement. From these, the horizontal tensile stress, horizontal strain and stiffness are computed.

Determination of Fatigue Life ($N_f$) by Indirect Tensile Fatigue Test (ITFT)

Fatigue life is defined as the number of load cycles until failure occurs in bituminous mixtures and represents the ability of the mixture to withstand the traffic cyclical loads. To determine the fatigue function, BS EN 12697-24 (IT-CY) is conducted at a temperature of 20° C. and frequency of 2 Hz. In this test, a cylindrical specimen is loaded between two loading strips along the vertical diametrical plane, which causes relatively uniform tensile stress along this plane. A cylinder-shaped test specimen is exposed to repeated compressive loads with a haversine load signal with rest periods through the vertical diametrical plane. This loading develops a relatively uniform tensile stress perpendicular to the direction of the applied load and along the vertical diametrical plane, which causes the specimen to fail by splitting along the central part of the vertical diameter. ITFT was conducted to obtain the fatigue life of asphalt mixture sample under several different stress levels in this project.

Figure 3:
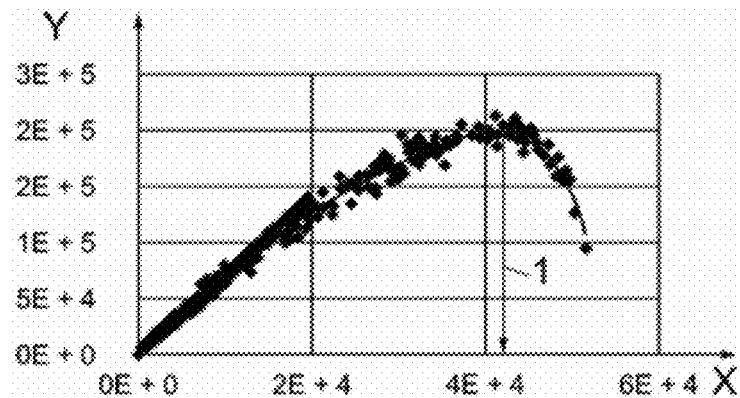
FIG. 3 is a diagram depicting determination of fatigue life (energy concept). X is the number of load cycles, Y is the energy ration in n/strain and 1 is the fatigue life.

For the examples, the controlled stress test mode is used, and the modulus measured directly during the progress of the test is Resilient Modulus (MR), thus, the approximation for energy ratio will be as in the following equation:

$$R_\sigma = N_i \times M_{Ri}$$

where $N_i$ and $M_{Ri}$ are the number of cycles and resilient modulus (MPa) at cycle i, respectively. According to the BSEN 12697-24 (Annex E) standard, based on energy concept, fatigue life of the cylindrical specimen corresponds to the peak point of the energy ratio (cycle number multiplied by resilient modulus) $(N \times M_R)$ whose diagram is shown in FIG. 3.

This demonstration of fatigue life is considered a more exact and sensible method of characterizing fatigue life than simply deciding failure as an arbitrary condition, for example, full fracture of the sample, or a 50 or 90% reduction in initial stiffness.

The cylindrical specimens are bonded to two steel deformation strips using epoxy resin to enable them to be fitted to the extensometers which are linear variable displacement transducers (LVDTs) for measuring the diameter of specimen in this project. The strips are fixed by glue on opposite sides of the horizontal diametrical plane. The transducers are arranged so that the variation of the horizontal diameter can be measured by the variation of the distance between the two strips from the average value of the two transducers. The glue film is kept as thin as possible, and the resin is allowed to harden for a minimum period of 6 h prior to testing. The gluing of the strips is undertaken according to the standard BS EN 12697-24 (IT-CY). The specimens are conditioned at the test temperature (20° C.) for at least 4 h prior to testing according to BS EN 12697-24. Subsequently, they are tested in a constant temperature cabinet at the controlled test temperature (20° C.).

Raw Materials

TABLE 2

Specification of raw materials used in Examples

| Constituent Material | Type |
| --- | --- |
| Bitumen | Grade 60/70 Pen |
| Coarse Aggregate (retained on 5 mm BS sieve) | Crushed rock (Granite) |
| Fine Aggregate (passing 5 mm BS sieve) | Crushed rock (Granite) |
| Filler (passing 75 μm BS sieve) | Crushed filler (Granite) |

TABLE 2-continued

Specification of raw materials used in Examples

| Constituent Material | Type |
| --- | --- |
| Crumb rubber | Crushed waste tire from Hong Kong Crushed waste tire from Greater Bay Area |

Sample Preparation

The sample preparation process includes weighing the mass of raw materials (aggregate, rubber, filler, and binder), preheating raw materials, mixing, short term conditioning, and compaction.

The aggregate, filler and binder are preheated at 160° C. for 1 h before mixing. No preheating is required for the recycled rubber.

The mixing temperature is 160° C. The mixing time depends on the mixing power of the mixer and the ultimate target is to achieve full coating of binder on aggregate. The mixing procedure of asphalt samples without rubber is first mixing of aggregate and binder and second mixing with filler. The mixing procedure of elastic layer samples is first: mixing of aggregate and rubber; second: mixing with binder; and third: mixing with filler.

The mixture is short-term conditioned for 1-2 h at 125-135° C. oven temperature respectively before compaction to simulate the real transportation process during road construction.

Figure 2:
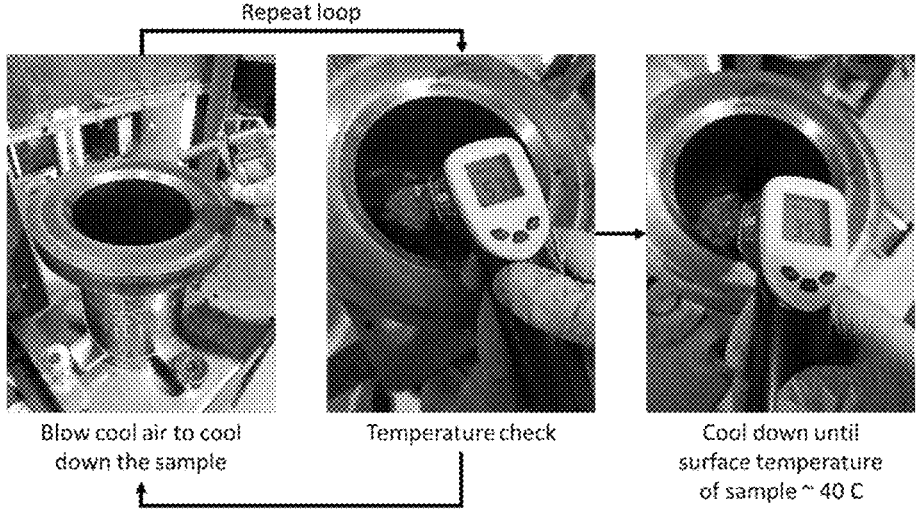
FIG. 2 demonstrates sample preparation for a compaction cycle specimen.

Various compaction programs were adopted to compact the rubber elastic layer samples due to the swelling and elasticity of the rubber particles. The gyratory compaction pressure is 600 kPa with an internal angle of 1.25° and speed of 30 rpm. The compaction process is shown in FIG. 2. Unlike conventional asphalt samples, one time compaction is not sufficient to produce a well-compact sample from rubber-including material. The cooling is achieved by blowing compress air into mold which contains sample inside. The compaction programs depend on the mix design air void and height. The compaction is finished until the surface temperature of the sample is 30-60° C.

Optimization of Rubber Gradation

Rubber gradation is one of the important parameters affecting the fatigue performance of the concrete. The coarse rubber acts as an elastic aggregate which increases the elasticity of the mixture. Besides, a light fraction of asphalt would diffuse into the fine rubber, and it has a better interaction and thus improves the overall structure integrity of the elastic layer. However, the diffusion requires a high temperature and a long duration to be significant. Therefore, the function of fine rubber would be void-filling and balancing the swelling effect from coarse rubber since fine rubber causes less expansion to the elastic layer. The experiments determine a balance between coarse recycled rubber and fine recycled rubber.

Three different gradations were analyzed in different ratios of recycled coarse rubber and fine rubber. The coarse rubber and the fine rubber are defined as the rubber having size >1.18 mm and <1.18 mm respectively. Design A contains 53% coarse and 47% fine, while design B and design C are developed by reducing coarse rubber of design A by 20% and 40% respectively. The size ratio the same within coarse rubber and fine rubber are consistent.

To achieve the optimal rubber gradation, other parameters in the mix design which include aggregate gradation, binder content, air void, mixing and compaction condition are kept consistent. The source of rubber is from Hong Kong waste tire.

TABLE 3

| Particles size distribution of rubber | | | |
| --- | --- | --- | --- |
| | mass % | | |
| Size (mm) | A | B | C |
| Coarse (1.18-5) | 53 | 33 | 13 |
| Fine (0.075-1.18) | 47 | 67 | 87 |

TABLE 4

| ITFT results of different rubber gradation | | | |
| --- | --- | --- | --- |
| Stress | Fatigue life ($N_f$) | | |
| Level (kPa) | A | B | C |
| 285 | 41919 | 30558 | 31129 |
| 390 | 9138 | 14081 | 9861 |
| 500 | 4399 | 3266 | 4116 |
| 600 | 2745 | 1211 | 766 |

Figure 4:
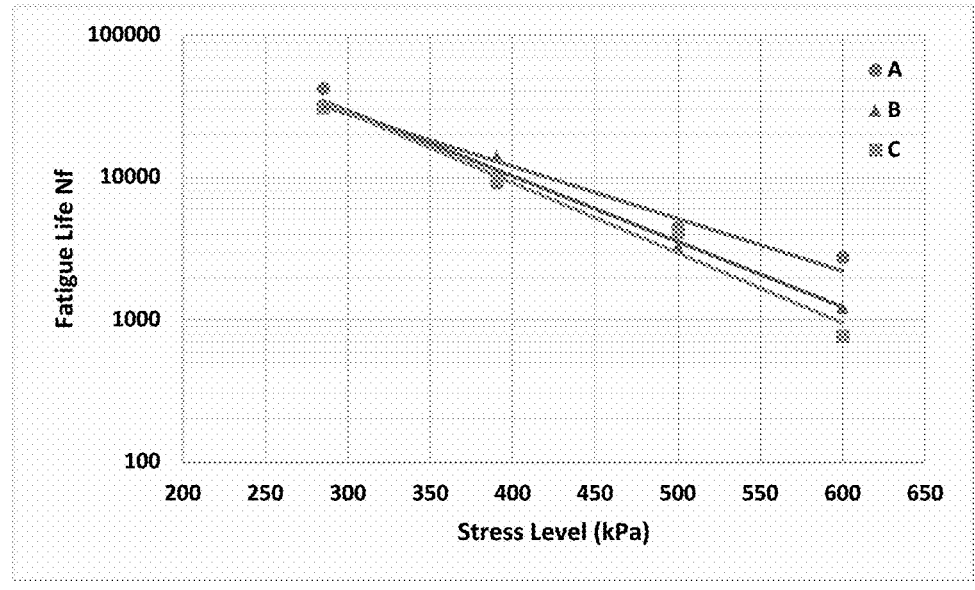
FIG. 4 is the ITFT results of different rubber gradation.

It is concluded that the fatigue performance of rubber design A>B>C from FIG. 4. It shows that design A is the overall best rubber gradation since it has the highest fatigue life among different stress levels. Thus, design A is selected as the optimal balance between coarse rubber and fine rubber. Further designs would adopt design A as the rubber gradation in the mix design.

Optimization of Rubber Content

TABLE 5

| Specification of various elastic layer mix design | | | | |
| --- | --- | --- | --- | --- |
| Design | Aggregate gradation | Rubber gradation | Rubber Content (%) | Binder Content (%) |
| 0% rubber (control) | Approved existing design (FIG. 5) | — | 0 | 3.5 |
| 3% rubber | Volumetric substitution of 3% rubber | 53% coarse (1.185 mm) 47% fine (0.075-1.18 mm) | 3 | 5 |
| 4% rubber | Volumetric substitution of 4% rubber | | 4 | 5.5 |
| 5% rubber | Volumetric substitution of 5% rubber | | 5 | 6 |

Rubber designs adopt the idea of volumetric substitution of rubber into the aggregate (control). The rubber content is defined as the weight % of the sum of aggregate and rubber. The swelling effect and the elasticity of rubber causes internal stress in the concrete and thus results in the premature failure and structural instability. Since the target layer is the sub-base layer, the sample could be compacted to a very high extent to ensure structural stability.

For the aggregate gradation, the control design follows the existing design of HK roadbase (sub-base layer) which is approved by the Hong Kong Highway Department. From FIG. 5, the gradation of the control design falls into the lower bound and upper bound of the gradation requirement. Due to the density difference of aggregate and rubber, the aggregate gradations of rubber designs adopt the method of volumetric substitution of rubber. Since the sample is compacted to a very high extent, the rubber particle is assumed to be a rigid aggregate. To achieve volumetric substitution, densities of rubber (1.15 $g/cm^3$) and aggregate (2.60 $g/cm^3$) were accounted for in the calculation. The volumetric substitution starts with the aggregate gradation (in mass) of the control design and is followed by the subtraction of aggregate (in mass) which has equal volume with the rubber. The source of recycled rubber is from Hong Kong waste tire.

The binder content of the elastic sub-base layer design is higher than that of control due to the higher content of rubber and its surface area. More binder is needed to achieve a full coating of binder on the aggregate and rubber surface. The general guideline of binder content is an increase of 0.5% in binder content with an increase of 1% in rubber content.

TABLE 6

| Gradation of aggregate | | | |
| --- | --- | --- | --- |
| | Passing % | | |
| Sieve size (mm) | Lower bound | Upper bound | 0% rubber (control) |
| 50 | 100 | 100 | 100 |
| 37.5 | 90 | 100 | 98 |
| 28 | 70 | 94 | 89 |
| 20 | 62 | 84 | 71 |
| 14 | — | — | 64 |
| 10 | 49 | 67 | 57 |
| 5 | 37 | 55 | 46 |
| 2.36 | 27 | 43 | 37 |
| 1.18 | — | — | 28 |
| 0.6 | 13 | 28 | 19 |
| 0.3 | 7 | 21 | 13 |
| 0.15 | — | — | 10 |
| 0.075 | 2 | 8 | 6 |

TABLE 7

| Gradation of rubber | |
| --- | --- |
| Size (mm) | Mass % |
| Coarse (1.18-5) | 53 |
| Fine (0.075-1.18) | 47 |

Figure 5:
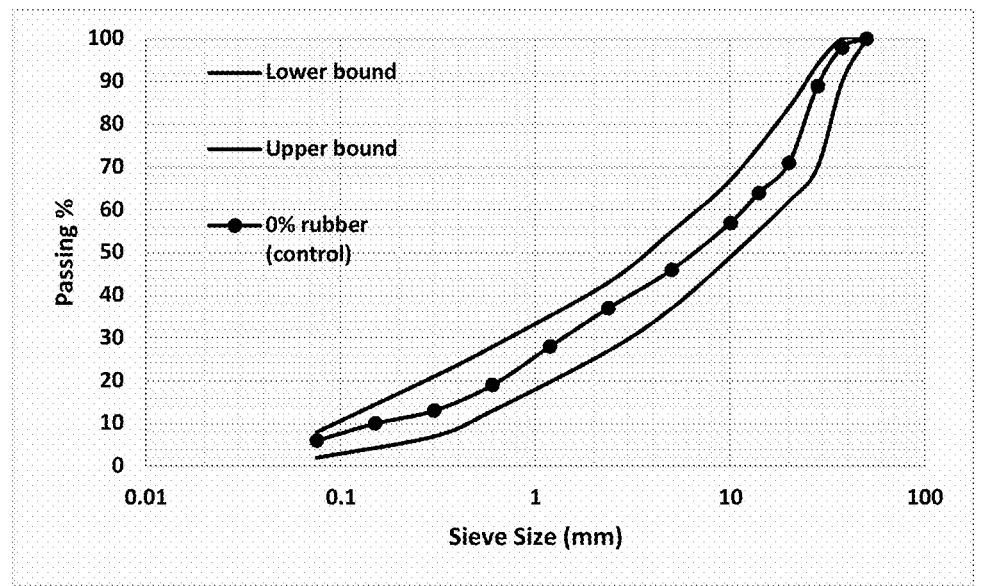
FIG. 5 depicts gradation of aggregate.

Both control and rubber samples were tested by ITFT, and the results are shown in Table 7, Table 8 and FIG. 5.

TABLE 8

| ITFT results of 0% rubber (control) | |
| --- | --- |
| Stress Level (kPa) | Fatigue life ($N_f$) |
| 285 | 24116 |
| 390 | 8839 |
| 500 | 4191 |
| 600 | 2565 |

TABLE 9

| ITFT results of different rubber content | | | |
| --- | --- | --- | --- |
| Stress Level | Fatigue life ($N_f$) | | |
| (kPa) | 3% rubber | 4% rubber | 5% rubber |
| 340 | 50270 | 45031 | 30396 |
| 390 | 21769 | 14752 | 10758 |

TABLE 9-continued

| ITFT results of different rubber content | | | |
| --- | --- | --- | --- |
| Stress Level | Fatigue life (N$_f$) | | |
| (kPa) | 3% rubber | 4% rubber | 5% rubber |
| 440 | 9949 | 11206 | 11878 |
| 500 | 8583 | 7128 | 6237 |

Figure 6:
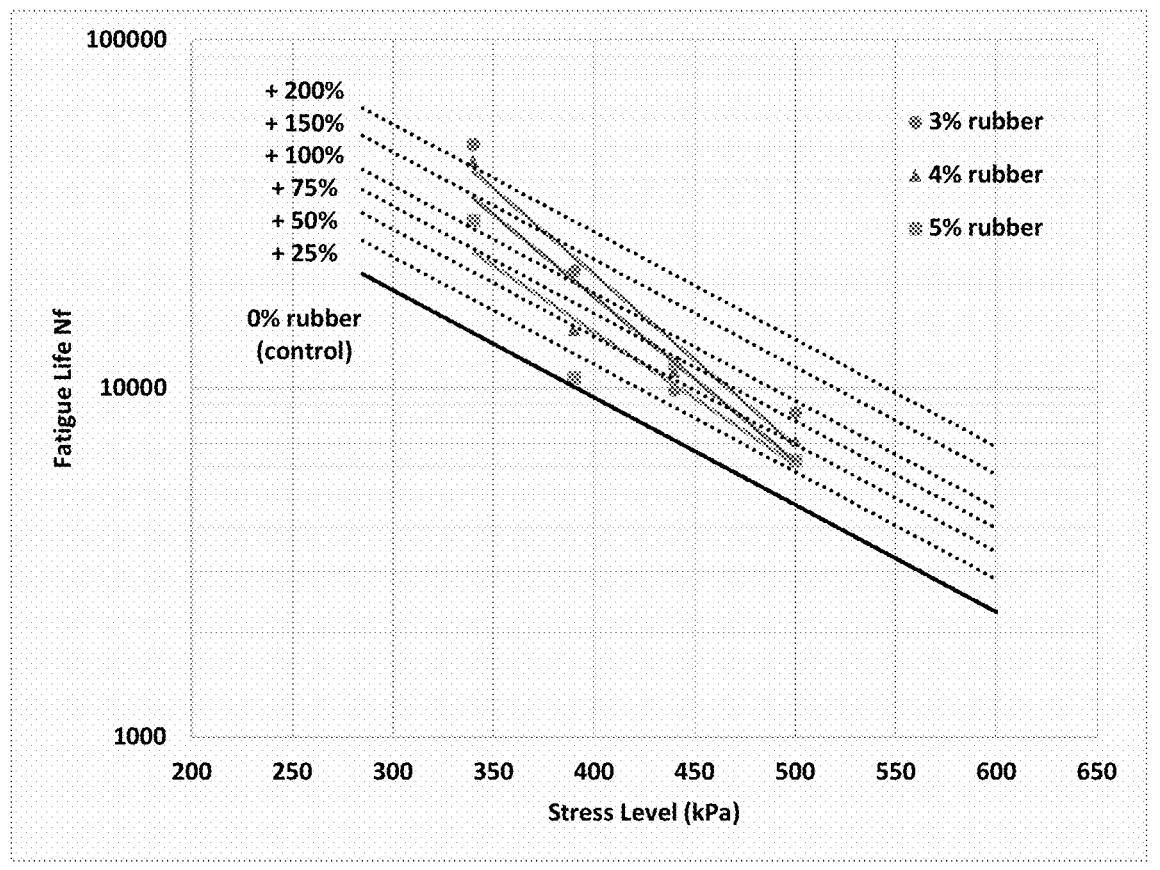
FIG. 6 is the ITFT results of different rubber content.

Referring to FIG. 6, the results could be summarized in the following. First, compared to the control, all rubber-containing sub-base layer compositions demonstrate better fatigue performance. For stress <400 kPa, which is the range of stress of HK roadbase/sub-base layer, 3% rubber even results in more than 150% fatigue life improvement. Second, it is observed that 3% rubber results in the best fatigue performance among different rubber contents at different stress levels. In addition, 3% rubber gives the best overall fatigue life, when compared to 4% rubber and 5% rubber. At the higher rubber contents of 4% and 5%, the swelling effect of rubber increases and it negatively impacts the structural stability resulting in lower fatigue life. However, in the field, that is, actual road construction, since roadbase/sub-base layer is the bottom layer of the entire flexible pavement system, the swelling of rubber in the pavement would not be as significant as in the lab scale tests. It is concluded that rubber content of 3-5% could not only result in better fatigue performance but also high recyclability of waste tire rubber.

Densities of Roadbase/Sub-Base Layer Samples

TABLE 10

| Densities of different mix designs Density (g/cm$^3$) | | | |
| --- | --- | --- | --- |
| 0% rubber (control) | 3% rubber | 4% rubber | 5% rubber |
| 2.285 | 2.287 | 2.257 | 2.224 |

The source of rubber is from Hong Kong recycled waste tire. It is observed that the density of 3% rubber design is similar to that of the control samples. The rubber is believed to fill the air void and results in similarity of density. The density of design decreases with increasing rubber content due to the low density of rubber and high swelling effect from rubber.

Source of Crumb Rubber

To explore the application of the invention to other recycled materials, different sources of rubber were used in the design mix. In the previous sections, the rubber used is from Hong Kong waste tires. However, the crumb rubber is sourced from mainland China (mainly the Greater Bay Area).

The mainland rubber mix design adopts the same design parameters of 3% rubber (Hong Kong).

TABLE 11

| ITFT results of different sources of rubber | | |
| --- | --- | --- |
| Stress Level | Fatigue life (N$_f$) | |
| (kPa) | HK rubber | Mainland rubber |
| 340 | 50270 | 51999 |
| 390 | 21769 | 29984 |

TABLE 11-continued

| ITFT results of different sources of rubber | | |
| --- | --- | --- |
| Stress Level | Fatigue life (N$_f$) | |
| (kPa) | HK rubber | Mainland rubber |
| 440 | 9949 | 20487 |
| 500 | 8583 | 10633 |

Figure 7:
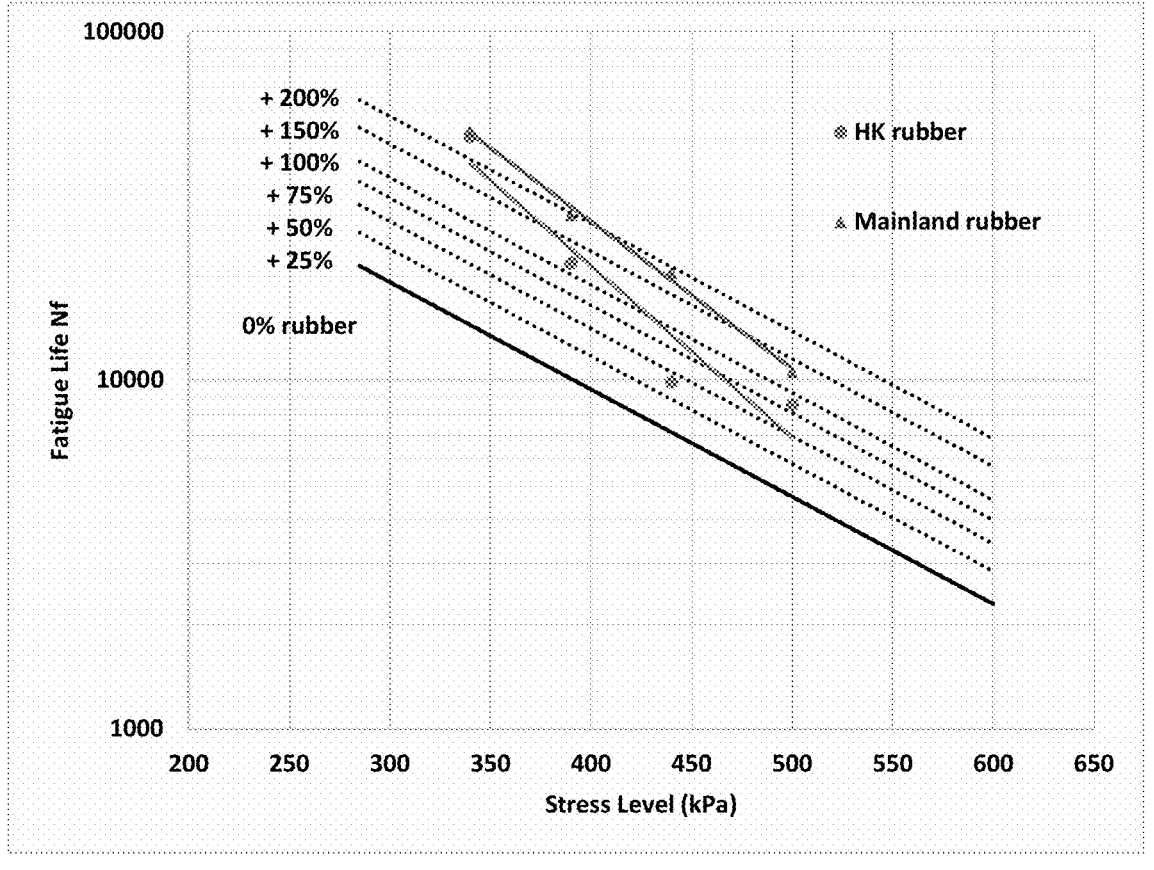
FIG. 7 is the ITFT results of the different rubber sources.

The results show that using the method of volumetric substitution of rubber into aggregate is valid in both the 3% Hong Kong rubber and 3% mainland rubber. The fatigue performance of both rubber is greater than that of control (FIG. 7). As long as the rubber is from waste tires, the composition of the recycled rubber is fairly similar. Despite deviation of data, the source of rubber generally does not cause any negative impact on the fatigue performance of pavement when compared to the control.

Rule of Thumb of Mix Design

Through the examples, it was determined that there are some general design principles for using the dry process rubber asphalt mix design in a structural layer such as the sub-base layer/roadbase layer. These principles are set forth below:

Rubber gradation is a key parameter and it preferably contains approximately 53% coarse rubber (1.18-5 mm) and approximately 47% fine rubber (0.075-1.18 mm). The coarse rubber acts as a kind of elastic aggregate and the fine rubber fills the voids in the pavement.

Rubber content should range in 3-5%, preferably 3% for better performance

Volumetric substitution of rubber into aggregate (control) is a valid and simple method of designing aggregate gradation. Since the mixture is compacted to a very high extent, rubber is treated as a kind of rigid aggregate to fill into the gap or space from the aggregate volume subtracted from the control.

Multiple and high extent of compactions are needed to achieve a good quality of pavement, due to the swelling effect of rubber and high residual temperature; this prevents structural instability such as premature failure. The compaction continues until the surface temperature of pavement is 30-60° C.

The design rule of thumb is simple and effective for dry process rubber asphalt.

The embodiments were chosen and described in order to best explain the principles of the invention and its practical application, thereby enabling others skilled in the art to understand the invention for various embodiments and with various modifications that are suited to the particular use contemplated.

As used herein and not otherwise defined, the terms "substantially", "substantial", "approximately", and "about" are used to describe and account for small variations. When used in conjunction with an event or circumstance, the terms can encompass instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

The invention claimed is:

1. A fatigue-resistant flexible road structure comprising:
one or more sub-base structural support layers positioned over a compacted earth foundation, at least one of the one or more sub-base structural support layers being an elastic sub-base layer including aggregate, filler, binder, and recycled tire rubber, the recycled tire rubber being included in an amount of 3% to 5% by weight of the sum of aggregate, filler, and rubber, the elastic sub-base layer having a fatigue life at least 25 percent greater than a non-elastic sub-base layer without recycled rubber and the elastic sub-base layer having a modulus of elasticity at least 25 percent lower than a non-elastic sub-base layer without recycled rubber;
one or more load-distributing base layers positioned over the one or more sub-base structural support layers, the one or more load-distributing base layers including at least aggregate, filler, and binder, and having an air void content of approximately 3 to 5 percent;
one or more surface layers positioned above the one or more load-distributing base layers, the one or more surface layers including at least one vehicle-contacting layer configured to prevent surface water from entering the base and sub-base layers, the one or more surface layers having an air void content greater than the air void content of the one or more load-distributing base layers.

2. The fatigue-resistant flexible road structure of claim 1, wherein the elastic sub-base layer is a dry process sub-base layer wherein the aggregate is present in an amount from approximately 82 to 86.5 weight percent and a particle size distribution of approximately 0.075 mm to 50 mm, the filler is present in an amount approximately 7 to 9 percent by weight and a particle size smaller than approximately 0.075 mm, and the binder is present in an amount of approximately 3.5 to 6 percent by weight.

3. The fatigue-resistant flexible road structure of claim 1, wherein the elastic sub-base layer binder is a bituminous binder.

4. The fatigue-resistant flexible road structure of claim 1, wherein the one or more load-distributing base layer binder is a bituminous binder.

5. The fatigue-resistant flexible road structure of claim 1, wherein the one or more surface layers includes an upper vehicle-contacting surface layer and a lower surface layer.

6. The fatigue-resistant flexible road structure of claim 5, wherein the upper vehicle-contacting surface layer has an air void content of approximately 18 to 25 percent.

7. The fatigue-resistant flexible road structure of claim 5, wherein the lower surface layer has an air void content of approximately 3 to 5 percent.

8. The fatigue-resistant flexible road structure of claim 1, wherein a total thickness of the one or more sub-base structural support layers 400 to 800 millimeters.

9. The fatigue-resistant flexible road structure of claim 1, wherein a total thickness of the one or more surface layers is 40 to 80 millimeters.

10. The fatigue-resistant flexible road structure of claim 1, wherein a total thickness of the one or more base layers is 50 to 200 millimeters.

11. The fatigue-resistant flexible road structure of claim 1, wherein the one or more sub-base structural support layers includes a lower sub-base layer and an upper sub-base layer and wherein the elastic sub-base layer is the upper sub-base layer.

12. The fatigue-resistant flexible road structure of claim 1, wherein the one or more sub-base structural support layers includes a lower sub-base layer and an upper sub-base layer and wherein the elastic sub-base layer is the upper sub-base layer and wherein the lower sub-base layer includes aggregates without a binder.

13. The fatigue-resistant flexible road structure of claim 2, wherein the recycled rubber has a particle size distribution of 40 to 50 percent fine particles have a particle size of 0.075 to 1.18 millimeter and 50 to 60 percent coarse particles having a particle size of 1.18 to 5 millimeters.

14. The fatigue-resistant flexible road structure of claim 2, wherein the recycled rubber has a particle size distribution of 30 to 40 percent fine particles have a particle size of 0.075 to 1.18 millimeter and 60 to 70 percent coarse particles having a particle size of 1.18 to 5 millimeters.

15. The fatigue-resistant flexible road structure of claim 2, wherein the recycled rubber has a particle size distribution of 10 to 20 percent fine particles have a particle size of 0.075 to 1.18 millimeter and 80 to 90 percent coarse particles having a particle size of 1.18 to 5 millimeters.

16. A method for making the fatigue-resistant flexible road structure of claim 2, where, for the elastic sub-base layer:
the aggregate is mixed with recycled tire rubber to form an aggregate-recycled tire mixture;
the binder is added to the aggregate-recycled tire mixture; followed by mixing in the filler at a mixing temperature.

17. The method according to claim 16, further comprising annealing a mixture of aggregate, filler, binder, and recycled tire rubber at an annealing temperature by one or more compaction cycles.

18. The method according to claim 17, wherein the one or more compaction cycles includes a first compaction, cooling and a second compaction until the temperature at a surface is below 40° C.

* * * * *